United States Patent [19]

Postupack

[11] 3,833,362
[45] Sept. 3, 1974

[54] ELECTROCONDUCTIVE SOLDER

[75] Inventor: Dennis S. Postupack, Lower Burrell, Pa.

[73] Assignee: PPG Industries, Inc., Pittsburgh, Pa.

[22] Filed: Feb. 20, 1973

[21] Appl. No.: 333,593

Related U.S. Application Data

[62] Division of Ser. No. 73,619, Sept. 18, 1970, Pat. No. 3,734,698.

[52] U.S. Cl.............. 75/134 T, 75/134 B, 75/166 R
[51] Int. Cl........................ C22c 11/00, C22c 31/00
[58] Field of Search............ 75/134 T, 134 B, 166 R

[56] References Cited
UNITED STATES PATENTS

| | | | |
|---|---|---|---|
| 2,623,273 | 12/1952 | Murray et al. | 29/180 |
| 2,636,820 | 4/1953 | Bolton | 75/175 |
| 2,950,189 | 8/1960 | Ames | 75/134 T |
| 3,184,303 | 5/1965 | Grobin | 75/134 T |
| 3,226,226 | 12/1965 | Braun | 75/175 |
| 3,627,517 | 12/1971 | Ibscher | 75/134 T |
| 3,765,880 | 10/1973 | Cox et al | 75/173 R |

*Primary Examiner*—L. Dewayne Rutledge
*Assistant Examiner*—E. L. Weise
*Attorney, Agent, or Firm*—Edward I. Mates

[57] ABSTRACT

A tin-free alloy for use in making an electrical solder connection between a tinned copper wire and a ceramic silver conductive stripe on a glass substrate. The solder connection is useful in electroconductive windows, particularly laminated windows fabricated at a temperature range up to about 300°F.

2 Claims, No Drawings

ELECTROCONDUCTIVE SOLDER

This is a division of application Ser. No. 73,619, filed Sept. 18, 1970, now U.S. Pat. No. 3,734,698, dated May 22, 1973.

BACKGROUND OF THE INVENTION

This invention relates to metal alloy solders having utility in transparent electroconductive glass windows or transparent laminated windows of glass and plastic provided with a transparent electroconductive metal oxide film on a glass substrate. This solder is used to secure a braided conductor composed of tin-coated copper wires to a bus bar formed of a layer of ceramic material containing silver on a glass substrate. The silver containing bus bar is in electrical contact with the conductive coating. The glass substrate is not capable of withstanding high temperatures of soldering normally encountered in soldering performed on metal substrates.

In the past, solders containing tin were used in the manufacture of such electroconductive windows. However, tin alloy solders were unsatisfactory. The solder connection was difficult to maintain using tin alloy solders. Furthermore, tin alloy solders lacked the ductility necessary to yield in response to the stresses resulting from changes in temperature at the bus bar-solder interface due to the fact that the tin solder alloys had a different coefficient of thermal expansion than the bus bar or the glass on which the bus bar was mounted.

A typical solder used prior to the present invention, referred to as a Kester solder, that contains 61.5% tin by weight, 35.5% lead by weight, and 3% silver by weight, was unsatisfactory because glass chips are sometimes pulled from the body of the glass supporting the bus bar and its solder connections when coated glass substrates with Kester solder connections are stored. In addition, the electroconductivity of a window containing a tin alloy solder may be affected by the solder, because the tin in said solder depletes silver from the ceramic silver bus bar and forms various tin-silver alloys at the junction of the bus bar and the conductor wires. These alloys are brittle and provide sources of stress that ultimately weaken the glass substrate, particularly when laminated windows containing the aforesaid solder joints are tested under conditions simulating use as aircraft windows.

Attempts were made to attach the copper wire braid to the bus bars, using a commercially available indium alloy solder containing essentially 80% indium, 15% lead and 5% silver by weight. This indium alloy solder is available under the trade name of Indalloy No. 2. However, this indium alloy solder has a solidus temperature of 295° F. and a liquidus temperature of 311° F. which is very close to the temperature range (250° to 300° F.) at which the coated glass sheet is subsequently laminated during the formation of a laminated window.

The present invention provides a tin-free solder that does not alloy with the silver of the ceramic silver bus bar at soldering temperature and that has a solidus temperature at least 20° F above the conventional upper limit of the glass laminating cycle and as low a liquidus temperature as possible for particular use in the fabrication of laminated transparent electroconductive windows.

A soldering iron, to be effective, must be at a temperature at least 100° F. above the liquidus temperature of the solder during the soldering operation to insure the deposit of a flat layer of solder. At the same time, a practical upper limit of the soldering iron temperature is about 600° F. Higher soldering temperatures weaken the glass substrate and the bus bar. Hence, it is important that the solder used have a narrow range of concentrations of ingredients to provide the desired results of high solidus temperature, low liquidus temperature, good adhesion to ceramic silver and tinned copper braid and sufficient ductility to enable the solder joint to withstand temperature variations encountered during fabrication of a laminated window and during the service of said laminated window.

The preferred solder family has a solidus temperature range of about 325° to 350° F. (337° F. for the preferred composition) and a liquidus temperature range of about 380° to 430° F. (415° F. for the preferred composition).

DESCRIPTION OF THE PRIOR ART

The most pertinent solder in the prior art is believed to be Indalloy No. 2. Its major drawback is its tendency to melt during subsequent lamination.

British Pat. No. 1,137,427 to Chester, et al discloses various alloys capable of conducting large super currents in moderately high magnetic fields and comprises an alloy of lead with one other metal. The other metal may be indium. This reference discloses, for example, "an alloy of lead with between 40 and 70 atomic per cent of indium, the alloy containing finely divided particles of an oxide or oxides of one or both alloy materials disposed in the bulk of the material."

U.S. Pat. No. 3,261,725 to Jenkins, discloses, for example, "2% to 25% by weight of lead; 0% to 4% by weight of tin; 0% to 2% by weight of cadmium and the balance of indium."

U.S. Pat. No. 2,717,840 to Bosch recites, for example, "Pure indium is known to have the characteristic of wetting glass and similar known metallic materials and alloys of tin, lead, cadmium, bismuth, and zinc with suitable amounts of indium are also known to have that characteristic. Indium and the indium alloys mentioned, may, accordingly, be used as solders with the materials referred to, if the surfaces to be joined are properly prepared for soldering."

U.S. Pat. No. 2,464,821 to Ludwick et al discloses, for example, "the inclusion of indium in brazing or soldering alloys composed largely of a metal of the group consisting of lead, copper and silver," "an alloy composed of 3% silver, 1% indium and the balance essentially lead," and "An alloy containing 3% silver, 2% indium and the balance essentially lead." These compositions have melting points of, for example, 590° F. Such melting temperatures are too high to solder on glass substrates without harming the physical properties of the glass.

U.S. Pat. No. 3,184,303 to Grobin, discloses, for example, "A preferred general purpose superconductive solder for soldering to thin superconducting films, to silver lands formed on soda-lime glass, fused quartz, and crystalline quartz substrates as well as directly to these substrates has the following composition, by weight:

| Ingredient | Per cent |
|---|---|
| Tin | 30 |
| Lead | 19 |
| Indium | 50 |
| Silver | 1 |

Despite the various soldering compositions described above, there still remained a need for a tin-free solder that forms a ductile joint between a ceramic silver bus bar and a tinned copper wire braid on a glass substrate and that can be applied without damage to the glass substrate or the bus bar and remain serviceable in the finished windows even when used under such difficult conditions as are met by aircraft windows.

SUMMARY OF THE PRESENT INVENTION

The present invention differs from the prior art in the provision of an indium-lead solder containing silver that is free from tin so that it does not scavenge silver from a ceramic silver substrate and has the requisite ductility, solidus and liquidus temperatures needed in the fabrication of laminated windows. The present invention provides these desired objectives by controlling the range of concentration of the various ingredients of the solder so that the solder consists essentially of 45% to 65% indium by weight, 30% to 50% lead by weight and 2% to 5% silver by weight and is completely free from tin.

DESCRIPTION OF THE PREFERRED EMBODIMENT

As stated above, the preferred solder compositions conforming to the present invention have the following range of ingredients by weight and the characteristics recited in Table I.

TABLE I

| Ingredient | Per Cent by Weight |
|---|---|
| Indium | 45 to 65% (52.8% preferred) |
| Lead | 30 to 50% (43.9% preferred) |
| Silver | 2 to 5% (3.3% preferred) |
| Solidus temperature | about 325°F. to 350°F. (337°F. for preferred composition) |
| Liquidus temperature | about 380°F. to 430°F. (415°F. for preferred composition) |

Typical ceramic-silver bus bars to which tinned copper braided wires are soldered, have the following compositions:

COMPOSITION NO. 1

| Ingredient | Per Cent by Weight |
|---|---|
| PbO | 7.5 |
| $B_2O_3$ | 1.0 |
| $SiO_2$ | 1.5 |
| Flake Silver | 70.0 |
| French fat oil | 12.5 |
| Turpentine | 7.5 |

COMPOSITION NO. 2

| Ingredient | Per Cent by Weight |
|---|---|
| Finely divided silver | 72.6 |
| PbO | 9.3 |
| $SiO_2$ | 1.7 |
| $B_2O_3$ | 1.4 |
| Water | 7.5 |
| Ethyl alcohol | 7.5 |

In order to avoid production of bus bars which will develop in use excessive stresses in the glass, the thickness of the ceramic silver bus bars should not exceed about 0.005 inch and preferably should be below about 0.003 inch.

Any glass composition, such as commercial sheet, plate or float glass or low expansion glass containing a high concentration of boron, for example, any sold under the trade name of Pyrex, is suitable.

A typical electroconductive, laminated glass window is produced by first painting or screening or otherwise applying one or more ceramic silver bus bars to the surface of a glass sheet. The sheet is then heated to a temperature at which the ceramic silver frit becomes vitrified, for example, above about 600° to 800° F. to below the fusion point of the glass, usually between about 950° to 1,300° F. During this heating operation, the ceramic silver bus bar material becomes glazed and fired on to the glass to establish a firm bond between the glass and the bus bar. When the glass reaches a suitable temperature for coating, for example, 1,050° to 1,250° F., it is removed from the heating furnace and is immediately sprayed with a solution of a metal salt before substantial cooling of the glass sheet can take place.

A preferred filming composition found in U.S. Pat. No. 3,107,177 to Arnold E. Saunders and William E. Wagner consists essentially of 100 parts by weight of dibutyl tin oxide, 40 parts of ammonium acetate, 55 parts of 20% HF in 3A alcohol (density .83 grams per cubic centimeter) and 55 parts of n-propyl alcohol. This composition is sprayed onto the surface of the heated glass sheet with an atomized spray gun for a brief period, usually on the order of 2 to 20 seconds, depending upon the thickness of the film to be produced, the air pressure imposed on the atomizing spray gun, etc. Other suitable transparent electroconductive coatings, such as those disclosed in U.S. Pat. No. 2,564,677 to James K. Davis at column 4, lines 7 to 27, comprising tin oxide, indium oxide or cadmium oxide and mixtures thereof with one another and antimony oxide, which may also contain up to 20% of oxides of zinc, copper, iron, cobalt, vanadium, etc. are formed by applying appropriate metal salt compositions.

The coated glass is then chilled rapidly to impose at least a partial temper in the glass. This may range up to about 25,000 pounds per square inch compression stress at the glass surfaces.

In a typical soldering operation using a preferred solder composition, the coated surface of the glass sheet is masked, leaving only the bus bar surfaces exposed. The exposed bus bar surface, which has a width of approximately ¼ inch, is rubbed to ⅛ oxide coating that may have been deposited onto the bus bar during the coating step. A flux, such as any agent capable of cleaning the surfaces, such as an organic resin flux, is then applied to the rubbed bus bar surface to clean the surface. A suitable flux is sold commercially as Kester 1544 Flux. A soldering iron heated to 600° F. is wet with the solder. Then, the solder is applied to the upper surface of the clean bus bar. A tinned copper braid about 1/8 inch wide and about .015 inch thick is then cleaned with the aforesaid resin flux and is saturated on both surfaces with the desired solder with the soldering iron at 600° F. and deposited over the central portion of the bus bar in center to center alignment therewith.

A wooden stick holds the solder-coated braid over the solder coated bus bar, while the soldering iron, still at 600° F., presses onto the multilayer braid-bus bar configuration thus formed. The joint is allowed to cool gradually to below the liquidus temperature of the solder and the coated glass sheet with the braid attached to its bus bar is ready for further processing after the masking material is removed.

The soldering iron must have a flat tip whose width approximates the width of the exposed bus bar portion to insure the application of a flat coating of solder of approximately uniform thickness throughout the entire area of the solder joint. The soldering iron temperature must be at least 100° F. hotter than the liquidus temperature of the solder to insure a flat solder surface. The amount of solder applied to the surfaces of the bus bar and the braid is approximately the amount needed to provide a total thickness of about .020 inch of solder plus braid over the exposed ceramic silver bus bar surface. The soldering tip is preferably maintained at a temperature not exceeding 600° F. during the soldering operation to avoid weakening the tempered glass.

The coated glass sheet is then assembled to form a sandwich with a sheet of plasticized polyvinyl butyral and an additional glass sheet or a well known plastic substitute for glass such as a stretched acrylic like methyl methacrylate, a polycarbonate such as any disclosed in U.S. Pat. Nos. 3,028,365 and 3,117,019, preferably one prepared by reacting di(monohydroxyaryl) alkanes with derivatives of carbonic acid such as phosgene and bischloro-carbonic acid esters of di(monohydroxyaryl) alkanes.

If preferred, the sandwich with additional layers of plasticized polyvinyl butyral and glass and/or plastic substrates for glass are assembled, the assembly inserted within a thin bag of a plastic such as a mylar-polyethylene laminate of the type disclosed in U.S. Pat. No. 3,255,567 to Leroy D. Keslar et al. While the laminated assembly is inside the bag, the latter is evacuated and sealed and the bag with its contents immersed in an autoclave where the assembly is subjected to an elevated temperature and pressure for sufficient time to produce a transparent laminated window. A typical laminating cycle for polyvinyl butyral is 200 pounds per square inch of pressure at 300° F for 45 minutes.

Polyvinyl butyral is formed by reacting butyraldehyde with polyvinyl alcohol. The alcohol groups left unreacted are calculated as the per cent vinyl alcohol remaining in the polymer. Present-day safety-glass laminates are made using an interlayer whose base resin is composed of a polyvinyl alcohol partially condensed with butyraldehyde so that it contains from 15 per cent to 30 per cent of unreacted hydroxyl groups calculated as weight per cent of vinyl alcohol, less than 3 per cent by weight of ester groups calculated as weight per cent of vinyl acetate and the remainder of acetal groups calculated as vinyl butyral. This material is commonly called "polyvinyl butyral" or more exactly "partial polyvinyl butyral." Conventionally, polyvinyl butyral, as used in safety-glass laminates, contains a plasticizer.

Generally, the plasticizers used are water-insoluble esters of a polybasic acid or a polyhydric alcohol. Particularly desirable plasticizers for use in the present invention are triethylene glycol di(2-ethyl-butyrate), dibutyl sebacate, di(beta-butoxy-ethyl) adipate, and di-octyl phthalate. Other suitable plasticizers include triethylene glycol fully esterified with a mixture of 80 to 90 per cent caprylic acid and 10 to 20 per cent capric acid as described in U.S. Pat. No. 2,372,522, dimethyl phthalate, dibutyl phthalate, di(butoxyethyl) sebacate, methyl palmitate, methoxyethyl palmitate, triethylene glycol dibutyrate, triethylene glycol diacetate, tricresyl phosphate, triethyl citrate, butyl butyryl lactate, ethyl para-toluene sulfonamide, dibutyl sulfone, lauryl alcohol, oleyl alcohol, glycerol triricinoleate, methyl lauroyl glycolate, butyl octanoyl glycolate and butyl laurate. The above list of plasticizers does not represent all the known plasticizers which can be used. Such a list would be impractical and would serve no purpose since one skilled in the art can readily select a plasticizer from the many already known. It has been found preferable to use less than 25 parts of triethylene glycol di(2-ethyl-butyrate) plasticizer for every 100 parts by weight of polyvinyl butyral for the impact striking portion 16.

As an alternative, a polyurethane resin of the polyether type disclosed in U.S. Pat. No. 3,509,015 to Vernon G. Ammons et al may be used as an interlayer between the coated glass sheet and another transparent sheet of glass or plastic. A preferred polyurethane is produced as the reaction product of a glycol, a diisocyanate and a curing agent comprising a polyol having at least 3 hydroxyl groups and a diol. Other suitable polyurethanes contain hydroxyl terminated polyesters of the type described in U.S. Pat. No. 2,871,218 to Charles S. Schollenberger. Other suitable polyurethane resins are described in "Polyurethane Chemistry and Technology" by J. H. Saunders and K. C. Frisch, published by Interscience Publishers in 1964.

The present invention provides a ductile solder which does not readily alloy itself with the silver of the bus bar so that the bus bar conductivity is not reduced, even at the solder joints. Also, the melting point of the preferred solder is significantly higher than the temperature used during the laminating operation, so that the solder does not melt during laminating.

EXAMPLE

The benefit of the present solder was shown dramatically by tests performed on 36 glass samples of twin ground and polished plate glass .191 inch thick using the so-called concentric ring test. The samples tested were 6.1 inches square. Each sample in turn was mounted concentrically over a 6 inch diameter support ring that supported its bottom surface with a 3 inch diameter ring concentric with the support ring disposed over the upper surface of the sample. The upper ring was pressed downward on the upper surface of each sample at a load increasing at the rate of 200 pounds per minute, equivalent to an increase of about 3,000 pounds per square inch per minute, until fracture occurred. In each case, the fracture stress was recorded and the location of the failure noted.

Six sets of six samples per set were prepared. One set of samples was composed of annealed glass, another set of samples was coated and tempered without bus bars. The remaining four sets of six samples each were coated and tempered with 4 bus bars each 3½ inches long, 5/16 inch wide and about .001 inch thick and about ¾ inch apart disposed centrally of each sample.

The third set had bus bars but no solder joints. The remaining three sets had solder joints about 1 inch long disposed in the central portion of the two central bus bars to attach tinned copper braid to the central bus bars. Set No. 4 used Kester solder joints, set No. 5 used solder joints of Indalloy No. 2 and set No. 6 used solder joints of the preferred embodiment of the present invention to bond the braid of the central bus bars.

Table II shows the results of these concentric ring tests. The coated tempered samples without bus bars were used as the standard to measure relative strength of the samples tested.

TABLE II

CONCENTRIC RING TEST RESULTS

| Set No. | Average Stress at Failure | Per Cent Strength Reduction Compared to Standard | Location of Failure |
| --- | --- | --- | --- |
| 1 | 11,600 p.s.i. | 49% | 6 in glass |
| 2 | 22,650 p.s.i. | standard | 6 in glass |
| 3 | 17,000 p.s.i. | 25% | 4 at inner bus bar<br>2 at outer bus bar |
| 4 | 7,800 p.s.i. | 65% | 6 under solder joint |
| 5 | 15,750 p.s.i. | 30% | 6 under solder joint |
| 6 | 17,400 p.s.i. | 23% | 5 at inner bus bar<br>1 in glass (at glass defect) |

From the results of the above test, it is evident that the solder composition suggested by the present invention causes much less reduction in strength of the glass substrate than that experienced using the commercially available prior art solders applied to ceramic silver bus bars over glass substrates prior to the present invention. In addition, there were no failures encountered in the solder joint region using the solder suggested by the present invention, whereas the prior art solders evidently caused the samples to weaken in the vicinity of the solder joint.

The results of the experiments reported in Table II disclose a dramatic improvement in the efficiency of the presently suggested solder over that experienced by solders typical of the prior art. Such a dramatic improvement was totally unexpected at the time the experiments were performed and represents additional improvements over those recited previously — ability of the solder of the present invention to avoid melting during lamination as occurs with the Indalloy No. 2 solder and ability of the presently suggested solder to avoid alloying with the silver in the bus bar during soldering as is experienced with the tin-containing Kester solder.

The form of the invention described above represents an illustrative preferred embodiment and modifications thereof. It is understood that various changes may be made without departing from the spirit of the invention as defined in the claimed subject matter that follows.

I claim:

1. A tin-free alloy for use in making an electrical connection between a tinned copper wire and a ceramic silver conductive stripe mounted on a glass substrate consisting essentially of the following ingredients by weight: 45% to 65% indium, 30% to 50% lead, and 2% to 5% silver.

2. A tin-free alloy as in claim 1, wherein said ingredients consist essentially of:
   approximately 52.8% by weight of indium,
   approximately 43.9% by weight of lead, and
   approximately 3.3% by weight of silver.

* * * * *

UNITED STATES PATENT OFFICE
CERTIFICATE OF CORRECTION

Patent No. 3,833,362                Dated September 3, 1974

Inventor(s) Dennis S. Postupack

It is certified that error appears in the above-identified patent and that said Letters Patent are hereby corrected as shown below:

Column 4, line 54, delete "1/8" and insert --remove any metal--

Signed and sealed this 17th day of December 1974.

(SEAL)
Attest:

McCOY M. GIBSON JR.              C. MARSHALL DANN
Attesting Officer                Commissioner of Patents